United States Patent
Jung et al.

(10) Patent No.: US 10,067,873 B2
(45) Date of Patent: Sep. 4, 2018

(54) DATA STORAGE DEVICE AND OPERATING METHOD THEREOF

(71) Applicant: SK hynix Inc., Gyeonggi-do (KR)

(72) Inventors: Seok Hoon Jung, Gyeonggi-do (KR); Ji Hoon Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/001,994

(22) Filed: Jan. 20, 2016

(65) Prior Publication Data
US 2017/0123990 A1    May 4, 2017

(30) Foreign Application Priority Data
Oct. 29, 2015 (KR) .......................... 10-2015-0150659

(51) Int. Cl.
*G06F 12/08* (2016.01)
*G06F 12/0864* (2016.01)
*G06F 12/0895* (2016.01)

(52) U.S. Cl.
CPC ...... *G06F 12/0864* (2013.01); *G06F 12/0895* (2013.01); *G06F 2212/6042* (2013.01)

(58) Field of Classification Search
CPC .................... G06F 12/0864; G06F 12/0895
USPC ............................ 711/162, 114, 128, 207
See application file for complete search history.

(56) References Cited

U.S. PATENT DOCUMENTS

| | | | | |
|---|---|---|---|---|
| 4,638,426 A | * | 1/1987 | Chang | G06F 11/073 711/207 |
| 5,481,694 A | * | 1/1996 | Chao | G06F 3/0601 711/112 |
| 6,275,908 B1 | * | 8/2001 | Arimilli | G06F 12/0833 711/130 |
| 6,415,358 B1 | * | 7/2002 | Arimilli | G06F 12/0831 711/134 |
| 9,563,555 B2 | * | 2/2017 | Flynn | G11C 16/26 |
| 9,678,874 B2 | * | 6/2017 | Nellans | G06F 12/0804 |
| 2004/0139282 A1 | * | 7/2004 | Yoshioka | G06F 12/0238 711/133 |
| 2007/0283093 A1 | * | 12/2007 | Zohar | G06F 3/0607 711/114 |
| 2012/0054427 A1 | * | 3/2012 | Huang | G06F 3/06 711/108 |
| 2012/0072641 A1 | * | 3/2012 | Suzuki | G06F 3/0608 711/103 |
| 2012/0210041 A1 | * | 8/2012 | Flynn | G06F 1/183 711/3 |
| 2013/0054928 A1 | * | 2/2013 | Im | G06F 12/0246 711/170 |

(Continued)

FOREIGN PATENT DOCUMENTS

KR    101300657    8/2013

*Primary Examiner* — Pierre Miche Bataille
(74) *Attorney, Agent, or Firm* — IP & T Group LLP

(57) ABSTRACT

A method for operating a data storage device includes: dividing a cache into a plurality of cache areas; grouping a plurality of logical addresses into a plurality of logical address groups; allocating indexes to the respective logical address groups; and matching a read-requested first logical address set, a first cache area where data corresponding to the first logical address set are cached and an empty size of the first cache area, to an index corresponding to a logical address group to which the first logical address set belongs.

16 Claims, 16 Drawing Sheets

(56) References Cited

U.S. PATENT DOCUMENTS

| | | | | |
|---|---|---|---|---|
| 2013/0159626 A1* | 6/2013 | Katz | ............... | G06F 3/0608 |
| | | | | 711/119 |
| 2013/0166816 A1* | 6/2013 | Atkisson | ............ | G06F 12/0802 |
| | | | | 711/102 |
| 2013/0246732 A1* | 9/2013 | Seng | ............... | G06F 12/0246 |
| | | | | 711/203 |
| 2013/0346693 A1* | 12/2013 | Zhang | ............... | G06F 12/0864 |
| | | | | 711/121 |
| 2015/0039909 A1* | 2/2015 | Tseng | ............... | G06F 12/1408 |
| | | | | 713/193 |
| 2016/0077962 A1* | 3/2016 | Ehrlich | ............... | G06F 3/06 |
| | | | | 711/103 |

* cited by examiner

FIG.3

Read Cache Table (RCT)

| Index | RCA | ES | LBAs | | | | |
|---|---|---|---|---|---|---|---|
| 1 | A1, A2, ... or Az | n-cs | (n from 0 | n from mn | n from 2mn | n from 3mn | ...) LG1 |
| 2 | A1, A2, ... or Az | n-cs | (n from n | n from mn+n | n from 2mn+n | n from 3mn+n | ...) LG2 |
| 3 | A1, A2, ... or Az | n-cs | (n from 2n | n from mn+2n | n from 2mn+2n | n from 3mn+2n | ...) LG3 |
| ... | ... | ... | ... | | | | |
| m | A1, A2, ... or Az | n-cs | (n from (m-1)n | n from mn+(m-1)n | n from 2mn+(m-1)n | n from 3mn+(m-1)n | ...) LGm |

* m : CMDQ depth
  n : RCA size(number of sectors)
  cs : Size cached in RCA(number of sectors)

FIG.6

Read Cache Table (RCT)

| Index | RCA | ES | LBAs | |
|---|---|---|---|---|
| 1 | A1, A2, ... or Az | 8-cs | 0~7, 256~263, 512~519, 768~775, ••• | LG1 |
| 2 | A1, A2, ... or Az | 8-cs | 8~15, 264~271, 520~527, 776~783, ••• | LG2 |
| 3 | A1, A2, ... or Az | 8-cs | 16~23, 272~279, 528~535, 784~791, ••• | LG3 |
| ••• | ••• | ••• | ••• | |
| 32 | A1, A2, ... or Az | 8-cs | 248~255, 504~511, 760~767, 1016~1023, ••• | LGm |

\* m : 32
  n : 8
  cs : Size cached in RCA(number of sectors)

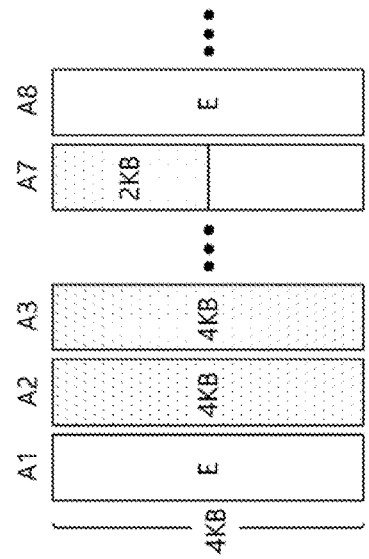
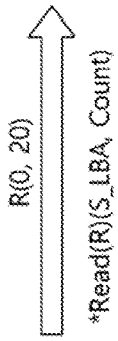
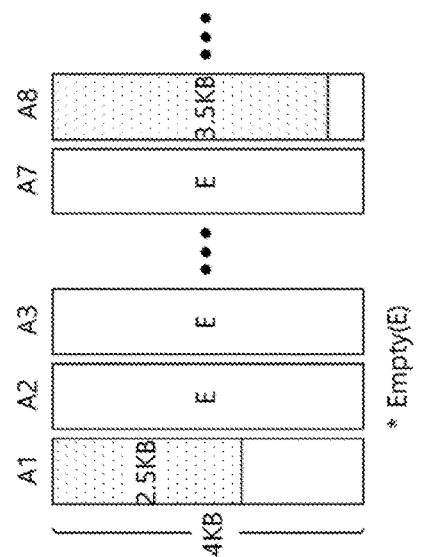
FIG.7

DATA STORAGE DEVICE AND OPERATING METHOD THEREOF

CROSS-REFERENCES TO RELATED APPLICATION

The present application claims priority under 35 U.S.C. § 119(a) to Korean application number 10-2015-0150659, filed on Oct. 29, 2015, in the Korean Intellectual Property Office, which is incorporated herein by reference in its entirety.

BACKGROUND

1. Technical Field

Various embodiments of the present invention generally relate to a data storage device and, more particularly, to a data storage device and an operating method thereof, capable of caching read-requested data.

2. Related Art

Recently, the paradigm for the computer environment has changed into ubiquitous computing so that computer systems can be used anytime and anywhere. As a result, use of portable electronic devices such as mobile phones, digital cameras, and notebook computers is increasing rapidly. Generally, portable electronic devices use data storage devices employing semiconductor memory devices for storing data. Data storage devices may be used as main or auxiliary memory devices for the portable electronic devices.

A data storage device using a semiconductor memory device has no mechanical driving parts, and generally exhibits excellent stability, durability, high information access speed and low power consumption. Example of data storage devices having such advantages include universal serial bus (USB) memory devices, memory cards having various interfaces, and solid state drives (SSD).

As portable electronic devices often process large files such as music or video files, data storage devices employed in portable electronic devices are required to have a large storage capacity. Hence, data storage devices generally employ as a storage medium, a semiconductor memory device having a high integration density for memory cells to provide a large storage capacity. For example, a flash memory device which is nonvolatile memory device, has a high integration density and is widely used in portable electronic device.

SUMMARY

Various embodiments of the invention are directed to a data storage device and an operating method thereof, capable of efficiently caching read-requested data.

According to an embodiment, a method for operating a data storage device may include: dividing a cache into a plurality of cache areas; grouping a plurality of logical addresses into a plurality of logical address groups; allocating indexes to the respective logical address groups; and matching a read-requested first logical address set, a first cache area where data corresponding to the first logical address set are cached and an empty size of the first cache area, to an index corresponding to a logical address group to which the first logical address set belongs.

According to an embodiment, a data storage device may include: a nonvolatile memory device; a control unit configured to control the nonvolatile memory device according to a request received from a host device; and a cache configured to cache data read out from the nonvolatile memory device, wherein the control unit divides the cache into a plurality of cache areas, groups a plurality of logical addresses of a predetermined unit into a plurality of logical address groups, allocates indexes to the respective logical address groups, and matches, when data corresponding to a read-requested first logical address set are cached in any one of the cache areas, a start logical address of the first logical address set, a first cache area where the data corresponding to the first logical address set are cached and an empty size of the first cache area, to an index corresponding to a logical address group to which the first logical address set belongs.

According to the embodiments, since it is possible to efficiently cache read-requested data, the hit ratio of cached data may be improved and the operation speed of a data storage device may be increased.

BRIEF DESCRIPTION OF THE DRAWINGS

FIG. 3 is a diagram illustrating an example of a read cache table, according to an embodiment of the present invention.

FIG. 6 is a diagram illustrating an example of a read cache table, according to another embodiment of the present invention.

FIG. 7 to FIG. 11 illustrate examples for operating a read cache, according to an embodiment of the present invention.

DETAILED DESCRIPTION

Figure 1:
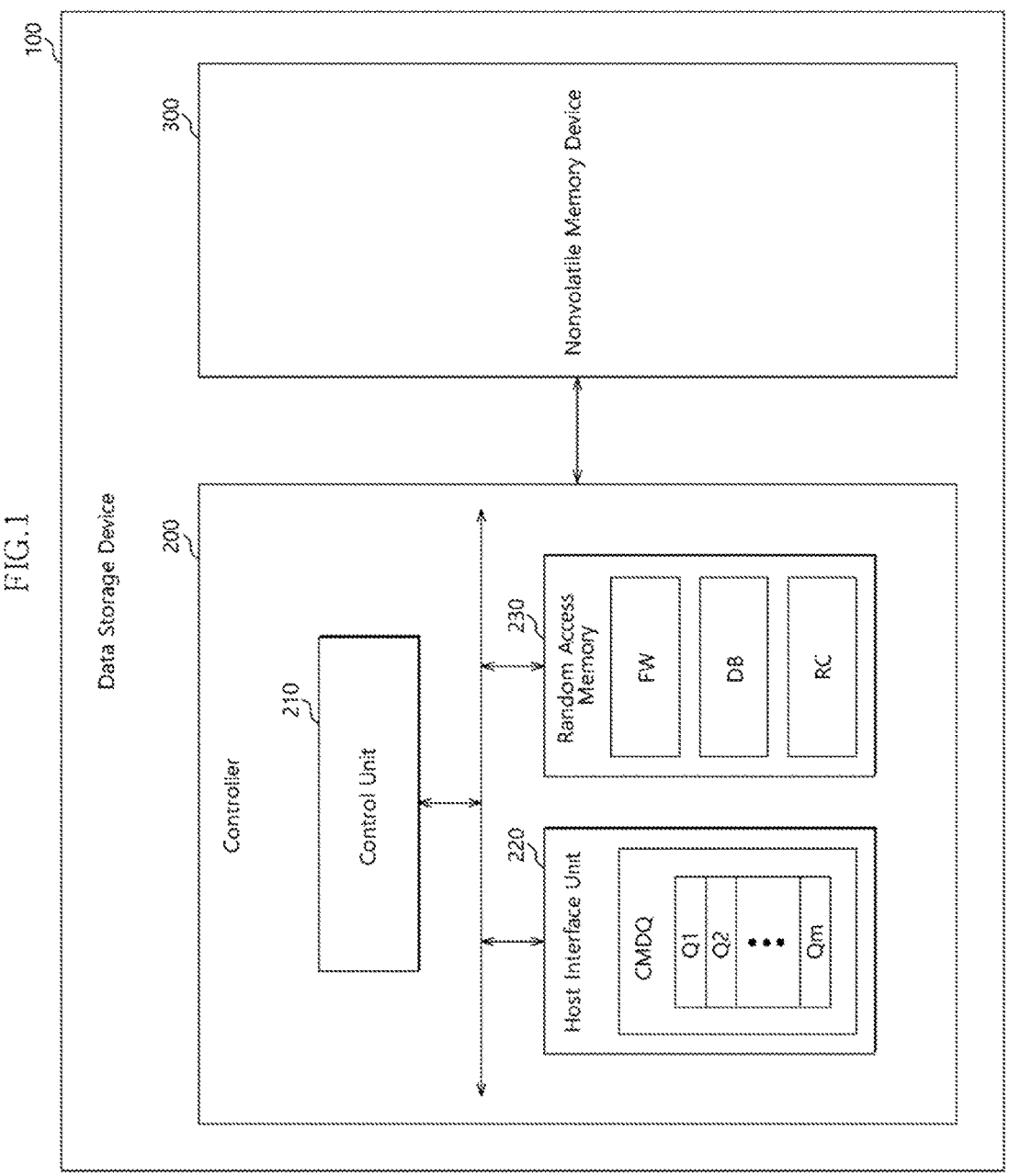
FIG. 1 is a block diagram illustrating a data storage device, according to an embodiment of the present invention.

In the present invention, advantages, features and methods for achieving them may become more apparent after a reading of the following embodiments described in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains may readily practice the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It may be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It may be further understood that the terms "comprises," "comprising," "includes," and/or "including," when used in this specification, specify the presence of at least one stated feature, step, operation, and/or element, but do not preclude the presence or addition of one or more other features, steps, operations, and/or elements thereof.

Hereinafter, a data storage device and an operating method thereof are described with reference to the accompanying drawings through various examples of embodiments.

FIG. 1 is a block diagram illustrating a data storage device 100, according to an embodiment of the present invention.

Referring to FIG. 1, the data storage device 100 may store data to be accessed by a host device (not shown) such as a mobile phone, an MP3 player, a laptop computer, a desktop computer, a game player, a TV, an in-vehicle infotainment system, and the like. The data storage device 100 may also be referred to as a memory system.

The data storage device 100 may be manufactured as any one of various kinds of storage devices according to the protocol of an interface which may be electrically coupled with the host device. For example, the data storage device 100 may be configured as any one of various kinds of storage devices such as a solid state drive (SSD), a multi-media card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and the like.

The data storage device 100 may be manufactured as any one of various kinds of package types. For example, the data storage device 100 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP), a wafer-level stack package (WSP), and the like.

The data storage device 100 may include a nonvolatile memory device 300. The nonvolatile memory device 300 may operate as the storage medium of the data storage device 100. The nonvolatile memory device 300 may be configured by any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PRAM) using a chalcogenide alloy, a resistive random access memory (ReRAM), and the like.

The data storage device 100 may include a controller 200. The controller 200 may include a control unit 210, a host interface (I/F) unit 220, and a random access memory 230.

The control unit 210 may control the general operations of the controller 200. The control unit 210 may analyze and process a signal, a command or a request which is inputted from the host device. For example, when a read request is received from the host device, the control unit 210 may read data from the nonvolatile memory device 300 based on a read-requested logical address. For another example, when a write request is received from the host device, the control unit 210 may store write data in the nonvolatile memory device 300 based on a write-requested logical address. To this end, the control unit 210 may decode and drive a firmware (FW) (or a software) loaded on the random access memory 230. The control unit 210 may be implemented in the form of a hardware and/or software. In an embodiment, the control unit 210 may be implemented in a combined form of a hardware and a software.

The host interface unit 220 may interface the host device and the data storage device 100 according to a protocol of the host device. For example, the host interface unit 220 may communicate with the host device through any suitable communication protocol including, for example, a universal serial bus (USB), a universal flash storage (UFS), a multi-media card (MMC), a parallel advanced technology attachment (PATA), a serial advanced technology attachment (SATA), a small computer system interface (SCSI), a serial attached SCSI (SAS), a peripheral component interconnection (PCI), a PCI express (PCI-E) protocol and the like.

The host interface unit 220 may include a command queue CMDQ. The command queue CMDQ having a queue depth of m may include m number of queues Q1 to Qm. Requests (or commands) received from the host device may be stored in the m number of queues Q1 to Qm, respectively. The requests queued in the command queue CMDQ may be processed sequentially or randomly by the control unit 210.

The random access memory 230 may store the firmware (FW) which is to be driven by the control unit 210. Also, the random access memory 230 may store management data necessary for the driving of the firmware (FW). The random access memory 230 may operate as a working memory of the control unit 210. For example, the management data stored therein may include an address mapping information for translating or mapping a logical block address (LBA) access-requested from the host device, into a physical block address (PBA) of the nonvolatile memory device 300.

The random access memory 230 may temporarily store data to be transmitted from the host device to the nonvolatile memory device 300 or from the nonvolatile memory device 300 to the host device. In other words, the random access memory 230 may operate as a data buffer (DB).

The random access memory 230 may cache data transmitted most recently or transmitted frequently, among data transmitted to the host device. Namely, the random access memory 230 may operate as a read cache RC which caches data read from the nonvolatile memory device 300, to quickly respond to a read request from the host device.

For improving the hit ratio of the read cache RC, the control unit 210 may divide the read cache RC into several read cache areas. The control unit 210 may manage a read cache table by matching each read cache area to a logical address of a predetermined unit. The control unit 210 may manage the read cache RC by referring to such a read cache table.

For example, the control unit 210 may divide the read cache RC into a plurality of read cache areas. The control unit 210 may further arrange together (i.e., group) logical addresses into logical address groups. For example, the control unit 210 may group the logical addresses into logical address groups from start logical addresses being incremented by a predetermined unit to the size of each read cache area.

The control unit 210 may further allocate indexes to the respective logical address groups, and manage a read cache table by matching a read-requested logical address, a read cache area where data corresponding to the logical address are cached and an empty size of the read cache area, to an index corresponding to a logical address group to which the logical address belongs.

Figure 2:
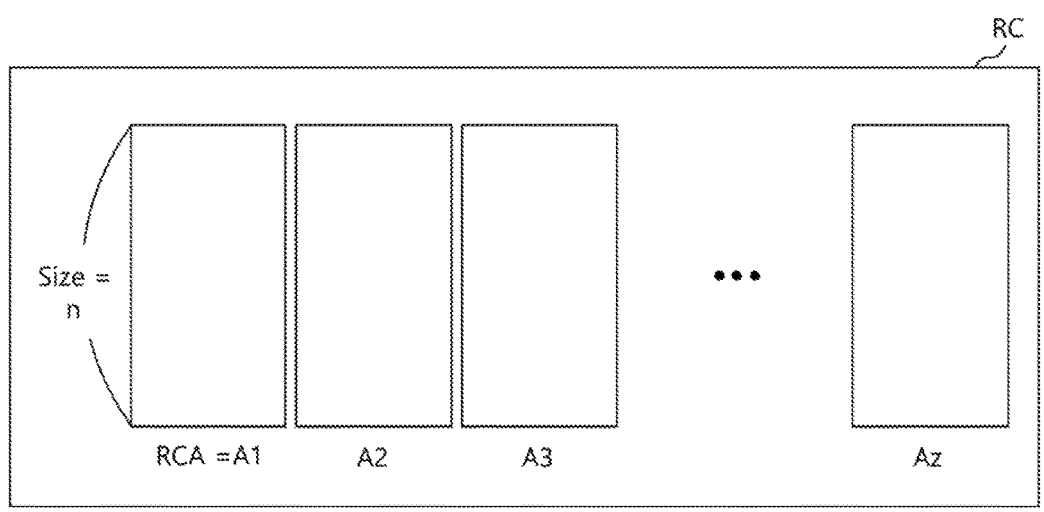
FIG. 2 illustrates a structure of a read cache, according to an embodiment of the present invention.

FIG. 2 illustrates an example of a structure of a read cache (RC), according to an embodiment of the present invention. For example, the read cache of FIG. 2 may be the read cache (RC) of the random access memory 230 in FIG. 1.

Referring to FIG. 2, the read cache RC may be divided into various read cache areas RCA such as A1 to Az.

In an embodiment, the size n of each read cache area RCA may correspond to the size of a physical address mapped to each logical address that is, the size of a memory area corresponding to each physical address.

In another embodiment, the size n of each read cache area RCA may correspond to an amount of data read out from the nonvolatile memory device 300 by each read operation. Hence, the read cache area RCA may be set to the size of data read out from the nonvolatile memory device 300 by each read operation.

In yet another embodiment, the size n of each read cache area RCA may be determined by the number of sectors. For example, the size n of each read cache area RCA may be expressed by the number of sectors, instead of a memory capacity (that is, bits or bytes) expressed by the binary scale. A sector may have a size of 512 bytes as a data unit corresponding to each logical address. For instance, where n is "2," the size of each read cache area RCA may mean 1 KB (512 bytes*2) corresponding to 2 sectors.

FIG. 3 is a diagram illustrating a read cache table RCT, according to an embodiment of the present invention. For example, the read cache table of FIG. 3 may be included in the random access memory 230 of the data storage device of FIG. 1. No data, also referred to as information, may be included in the read cache table RCT, during a time period starting right after the data storage device 100 is booted up and ending when a read request is received from the host device. The read cache table RCT may be updated in real time according to a read request from the host device so that at least information shown in FIG. 3 may be included therein.

The read cache table RCT may include various information such as index, a read cache area (RCA), an empty space (ES), and a logical block address (LBA). Indexes may be allocated to respective groups of logical block addresses. Read cache areas RCA may be matched to the indexes and empty sizes (or empty spaces) ES of the matched read cache areas RCA. Because data may be cached, by referring to the empty sizes of the read cache areas RCA allocated to the respective groups of logical addresses so that an empty space does not occur in a read cache area RCA, a maximum amount of data may be cached in the read cache RC.

The read cache table RCT may be classified into various indexes such as from 1 to m. The number of indexes may correspond to the queue depth m of the command queue CMDQ shown in FIG. 1. Indexes may be generated by the number m of the queues included in the command queue CMDQ.

Logical addresses including start logical addresses and subsequent addresses increased by a predetermined unit (or a predetermined interval) from each of the start logical address to the size (i.e., the number of sectors) n of the read cache area RCA may be grouped into a logical address group LG. In some embodiments, the predetermined unit may be determined as a value m*n, where m represents the queue depth and n represents the size of each read cache area RCA. Logical address groups LG1 to LGm may correspond to the indexes 1 to m, respectively.

For instance, n logical addresses from a start logical address 0, n logical addresses from a start logical address mn, n logical addresses from a start logical, address 2mn, n logical addresses from a start logical address 3mn, and remaining logical addresses calculated in this way may be grouped into the logical address group LG1 corresponding to the index 1.

Among the logical addresses belonging to a logical address group, only a read-requested logical address may be matched to a corresponding index. That is, if data corresponding to a read-requested logical address is cached in the read cache RC, the read-requested logical address may be matched to a corresponding index.

If data corresponding to a read-requested logical address is cached in the read cache RC, the information of a read cache area RCA where the data are cached may be matched to an index. Also, an information on a size obtained by subtracting a size cs of cached data from the size n of each read cache area RCA, that is, an empty size ES of a matched read cache area RCA may be matched to an index. Since the size n of each read cache area RCA may be expressed in the number of sectors, the empty size ES of a matched read cache area RCA may also be expressed in the number of sectors.

The following descriptions may be made on the assumption that a request, e.g., a read request or a write request, from the host device is provided in the form of a start logical address and the number of sectors or logical addresses. The start logical address and the number of sectors or logical addresses may be defined as a logical address set. In other words, the logical address set is defined as logical addresses from the start logical address to the number of sectors or logical addresses.

Figure 4:
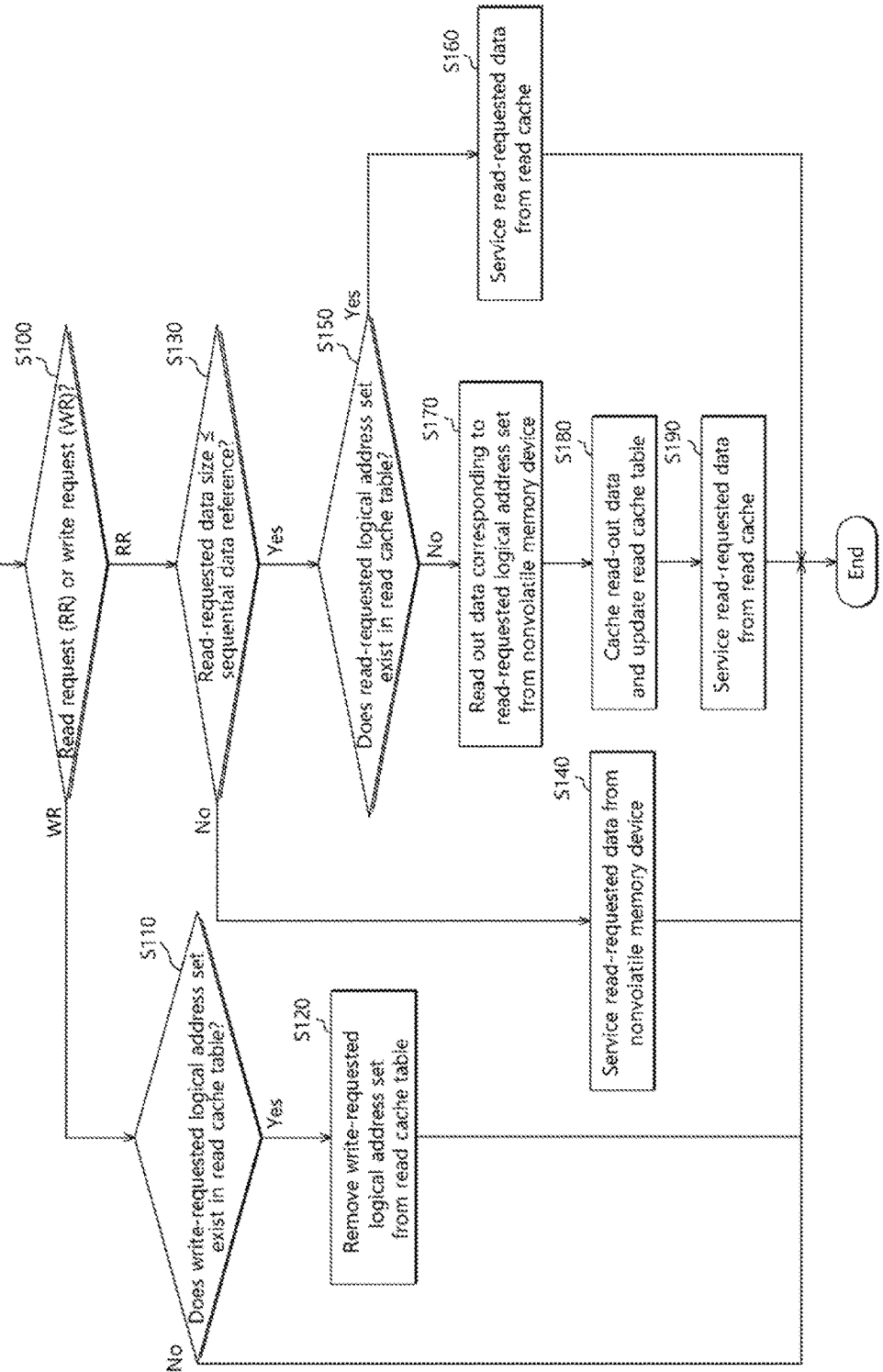
FIG. 4 is a flow chart illustrating an operation for processing a read cache, according to an embodiment of the present invention.

FIG. 4 is a flow chart illustrating an operation for processing read cache RC, according to an embodiment of the present invention. In describing FIG. 4, it is assumed that data are cached in the read cache RC and the read cache table RCT is updated according to a previous read request. For example, the operation of FIG. 4 may be performed by the controller 210 of FIG. 1.

At step S100, determination may be made as to whether a request currently received from the host device (not shown) of FIG. 1 is a read request RR or a write request WR.

In the case where the request currently received from the host device is the write request WR (S100, WR), because new data provided by the write request WR should be processed as valid data and old data cached in the read cache RC should be processed as invalid data, the process may proceed to step S110 and step S120.

At step S110, it is determined whether a write-requested logical address set exists in the read cache table RCT.

In the case where the write-requested logical address set does not exist in the read cache table RCT (S110, No), since it is meant that no data are cached, the process may be ended without update for the read cache table RCT.

In the case where the write-requested logical address set exists in the read cache table RCT (S110, Yes), since it is meant that data are cached, step S120 may be performed for processing the data cached in the read cache RC, as invalid data. At step S120, the write-requested logical address set may be removed from the read cache table RCT. A logical address matched to an index may be removed so that data corresponding to the currently write-requested logical address set are not serviced from the read cache RC upon a subsequent read request.

In the case where the request currently received from the host device is the read request RR (S100, RR), determination may be made as to whether data corresponding to a read-requested logical address set (also referred to as read-requested data) are cached in the read cache RC. A method for servicing the read-requested data may be changed based on a determination result.

At step S130, for determining whether the read-requested data are sequential data, it is determined whether the size of the read-requested data is smaller than or equal to a sequential data reference value. The size of the read-requested data may be calculated based on the read-requested logical address set, that is, a start logical address and the number of read-requested sectors. The sequential data reference value may be a reference value for determining a data size exceeding the reference value as sequential data and a data size smaller than or equal to the reference value as random data. The reference value may be changed.

In the case where the size of the read-requested data is greater than the sequential data reference value (S130, No), because of a limit in the capacity of the read cache RC, the read-requested data may be determined as being data not cached by a previous read request and as data not to be cached by the current read request. Accordingly, the process may proceed to step S140. At step S140, the read-requested data may be serviced from the nonvolatile memory device 300 of FIG. 1. Namely, the currently read-requested data are not cached.

In the case where the size of the read-requested data is smaller than or equal to the sequential data reference value (S130, Yes), the read-requested data may be determined as data cached by a previous read request and as data to be cached in the read cache RC to quickly respond to a subsequent read request. Accordingly, the process may proceed to step S150. At step S150, it is determined whether the read-requested logical address set exists in the read cache table RCT.

In the case where the read-requested logical address set exists in the read cache table RCT (S150, Yes), since it is meant that data are cached, the process may proceed to step S160. At step S160, the read-requested data may be serviced from the read cache RC. That is, an operation of reading the nonvolatile memory device 300 of FIG. 1 to service the read-requested data is not performed.

In the case where the read-requested logical address set does not exist in the read cache table RCT (S150, No), since it is meant that no data are cached, at steps S170, S180 and S190, the read-requested data may be serviced by being read out from the nonvolatile memory device 300, and may be cached in preparation for a subsequent read request.

At step S170, the read-requested data may be read out from the nonvolatile memory device 300. At step S180, the read-out data may be cached in the read cache RC by referring to the read cache table RCT, and the read cache table RCT may be updated. At step S190, the read-requested data may be serviced from the read cache RC.

Figure 5:
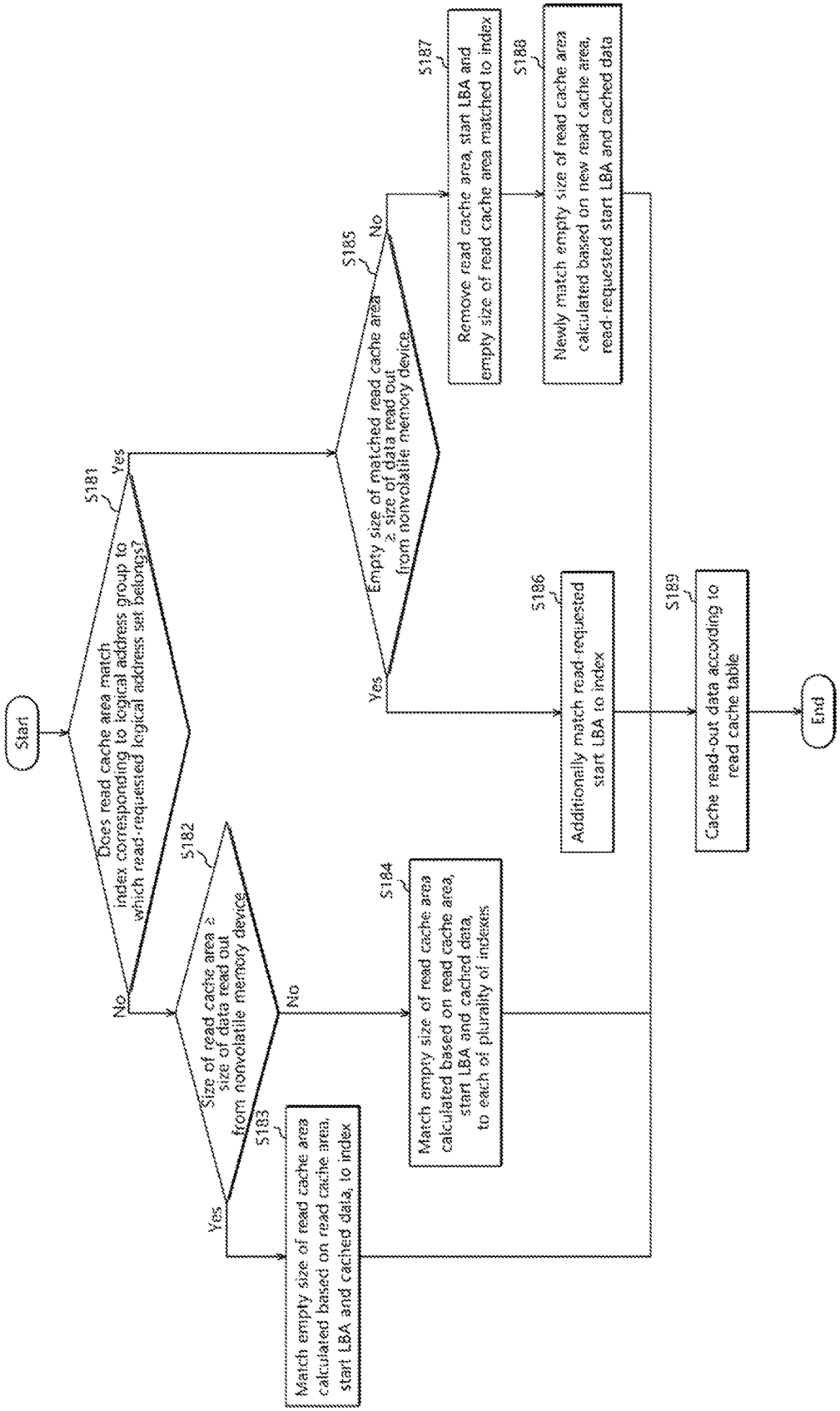
FIG. 5 is a flow chart illustrating an operation for caching of read data and updating a read cache table, according to an embodiment of the present invention.

FIG. 5 is a flow chart illustrating an operation for caching of read data and updating a read cache table according to an embodiment of the present invention. For example, the flow chart of FIG. 5 may be a detailed example of step S180 of FIG. 4. The operation of FIG. 5 may be performed by the controller 210 of FIG. 1. For the sake of simplicity, a flow chart is shown, in which an update operation (or a management operation) of the read cache table RCT is performed first and an operation of caching the read-requested data, is performed next. The read-requested data may be data read from the nonvolatile memory device 300, according to the read cache table RCT. It is noted, that the sequence of the update operation of the read cache table RCT and the data caching operation may be changed.

At step S181, it is determined whether a read cache area RCA has already been matched to an index corresponding to a logical address group to which the read-requested logical address set belongs.

In the case where a read cache area RCA has not been matched to the index (S181, No), an empty (not-matched) read cache area RCA may be newly matched to the index according to the size of the read-out data.

At step S182, it is determined whether the size of the data read out from the nonvolatile memory device 300 is smaller than or equal to the size of each read cache area RCA.

In the case where the size of the read-out data is smaller than or equal to the size of each read cache area RCA (S182, Yes), the read-out data may be cached in one read cache area RCA. At step S183, a read cache area RCA, a start logical address LBA of the read-requested logical address set and an empty size ES of the read cache area RCA calculated based on cached (or to-be-cached) data may be matched to the index.

In the case where the size of the read-out data is greater than the size of each read cache area RCA (S182, No), the read-out data may not be cached in one read cache area RCA. Accordingly, the read-out data may be cached in several read cache areas RCA. At step S184, a read cache area RCA, a start logical address LBA of the read-requested logical address set and an empty size ES of the read cache area RCA calculated based on cached (or to-be-cached) data may be matched to each of a plurality of indexes. In this case, information matched to each index due to previously cached data, for example, a read cache area RCA, a read-requested start logical address LBA and an empty size ES of the matched read cache area RCA, may be removed.

In the case where a read cache area RCA has already been matched to the index (S181, Yes), the read-requested data may be cached in an empty space of the already matched read cache area RCA or in a newly matched read cache area RCA according to the empty size ES of the read cache area RCA.

At step S185, it is determined whether the size of the data read out from the nonvolatile memory device 300 is smaller than or equal to the empty size ES of the matched read cache area RCA.

In the case where the size of the read-out data is smaller than or equal to the empty size ES of the matched read cache area RCA (S185, Yes), the read-out data may be cached in the empty space of the matched read cache area RCA. At step S186, a start logical address LBA of the read-requested logical address set may be additionally matched to the index. In other words, the start logical address LBA of the currently read-requested logical address set may be matched to the index along with a start logical address LBA corresponding to the data having already been cached in the read cache area RCA.

In the case where the size of the read-out data is greater than the empty size ES of the matched read cache area RCA (S185, No), the read-out data may not be cached in the empty space of the matched read cache area RCA. Accordingly, the read-out data may be cached in an empty read cache area RCA. At step S187, the read cache area RCA, the start logical address LBA and the empty size ES of the read cache area RCA already matched to the index may be removed. At step S188, a read cache area RCA, a start logical address LBA of the read-requested logical address set and an empty size ES of the read cache area RCA calculated based on cached (or to-be-cached) data may be newly matched to the index.

After the read cache area RCA, the start logical address LBA of the read-requested logical address set and the empty size ES of the read cache area RCA calculated based on the cached (or to-be-cached) data are matched to the index, the read-out data may be cached according to the read cache table RCT as in the step S189.

FIG. 6 is a diagram illustrating an example of a read cache table, according to an embodiment of the present invention. The example of FIG. 6 may be performed by the controller 210 of FIG. 1. The read cache table RCT in FIG. 6 may show information that may be included in the read cache table RCT. In this case, it is assumed that the queue depth m of the command queue CMDQ is 32 and the size n of each read cache area RCA is 8.

Referring to FIG. 6, indexes may be generated with the queue depth m of the command queue CMDQ being 32. Also, logical addresses from start logical addresses which increase by the unit of 256(=32(m)*8(n)), to logical addresses up to 8 as the size of each read cache area RCA may be grouped into each logical address group LG. Moreover, an empty size ES of a read cache area RCA may be calculated as a size obtained by subtracting a cached data size cs from 8 as the size of each read cache area RCA.

For instance, 8 logical addresses 0 to 7 from a first start logical address 0, 8 logical addresses 256 to 263 from a second start logical address 256, 8 logical addresses 512 to 519 from a third start logical address 512, and remaining logical addresses calculated in this way may be grouped into a logical address group LG1 corresponding to an index 1. The second start logical address 256 may be increased by 256 from the first start logical address 0, the third start logical address 512 may be increased by 256 from the second start logical address 256, and the fourth start logical address 768 may be increased by 256 from the third start logical address 512.

8 logical addresses 8 to 15 from a first start logical address 8, 8 logical addresses 264 to 271 from a second start logical address 264, 8 logical addresses 520 to 527 from a third start logical address 520, and remaining logical addresses calculated in this way may be grouped into a logical address group LG2 corresponding to an index 2. The second start logical address 264 may be increased by 256 from the first start logical address 8, the third start logical address 520 may be increased by 256 from the second start logical address 264, and the fourth start logical address 776 may be increased by 256 from the third start logical address 520.

8 logical addresses 16 to 23 from a first start logical address 16, 8 logical addresses 272 to 279 from a second start logical address 272, 8 logical addresses 528 to 535 from a third start logical address 528, and remaining logical addresses calculated in this way may be grouped into a logical address group LG3 corresponding to an index 3. The second start logical address 272 may be increased by 256 from the first start logical address 16, the third start logical address 528 may be increased by 256 from the second start logical address 272, and the fourth start logical address 784 may be increased by 256 from the third start logical address 528.

8 logical addresses 248 to 255 from a first start logical address 248, 8 logical addresses 504 to 511 from a second start logical address 504, 8 logical addresses 760 to 767 from a third start logical address 760, and remaining logical addresses calculated in this way may be grouped into a logical address group LGm corresponding to an index m. The second start logical address 504 may be increased by 256 from the first start logical address 248, the third start logical address 760 may be increased by 256 from the second start logical address 504, and the fourth start logical address 1016 may be increased by 256 from the third start logical address 760.

FIG. 7 to FIG. 11 illustrate examples for operating a read cache, according to an embodiment of the invention. The operations of FIG. 7 to FIG. 11 may be performed by the controller 210 of FIG. 1. For example, in describing FIG. 7 to FIG. 11, the read cache table RCT shown in FIG. 6 may be referred to.

With reference to FIG. 7, an update process of the read cache table RCT and a data caching process in the case where the size of read-out data is greater than the size of each read cache area RCA may be described.

Before a read request is received, the states of the read cache table RCT and the read cache RC may be as follows.

The index 1 may be in a state in which no data are matched thereto.

The index 2 may be in a state in which a read cache area (RCA) A1, a start logical address (S_LBA) 776 and an empty size (ES) 3 of the read cache area A1 are matched thereto. The index 2 may mean a state in which read data (2.5 KB=528 bytes*5 sectors) corresponding to 5 (=8−3) logical addresses from the start logical address 776 to a logical address 780 are cached in the read cache area A1.

The index 3 may be in a state in which a read cache area A8, a start logical address 528 and an empty size 1 of the read cache area A8 are matched thereto. The index 3 may mean a state in which read data (3.5 KB=528 bytes*7 sectors) corresponding to 7 (=8−1) logical addresses from the start logical address 528 to a logical address 534 are cached in the read cache area A8.

If a read request R(0, 20) for a set of 20 logical addresses from a start logical address 0 is received, since the size (10 KB=528 bytes*20) of read-out data is greater than the size (4 KB) of each read cache area RCA, the read cache table RCT may be updated and the read-out data may be cached as follows.

Since the start logical address 0 is a logical address belonging to the logical address group LG1 corresponding to the index 1 as shown in FIG. 6, matching may be made to the index 1. Among the empty read cache areas A2, A3 and A7, the read cache area A2 may be matched to the index 1. Since data are cached so that the matched read cache area A2 is fully cached, an empty size 0 of the read cache area A2 may be matched to the index 1.

In the same manner as the index 1, the empty read cache area A3, a start logical address 8 and an empty size 0 of the read cache area A3 may be newly matched to the index 2 as shown in FIG. 6. In this case, the read cache area A1, the start logical address 776 and the empty size 3 of the read cache area A1 which have been matched to the index 2 may be removed. The read cache area A1 of which matching is removed may be converted into an empty (or not-matched) read cache area.

In the same manner as the index 1, the empty read cache area A7, a start logical address 16 and an empty size 4 of the read cache area A7 may be newly matched to the index 3 as shown in FIG. 6. In this case, the read cache area A8, the start logical address 528 and the empty size 1 of the read cache area A8 which have been matched to the index 3 may be removed. The read cache area A8 may be converted into an empty (or not-matched) read cache area.

Matching new information to the index 2 and the index 3 according to the read request R(0, 20) may mean that recently serviced data are cached and data cached by a previous read request are not cached any more.

Figure 8:
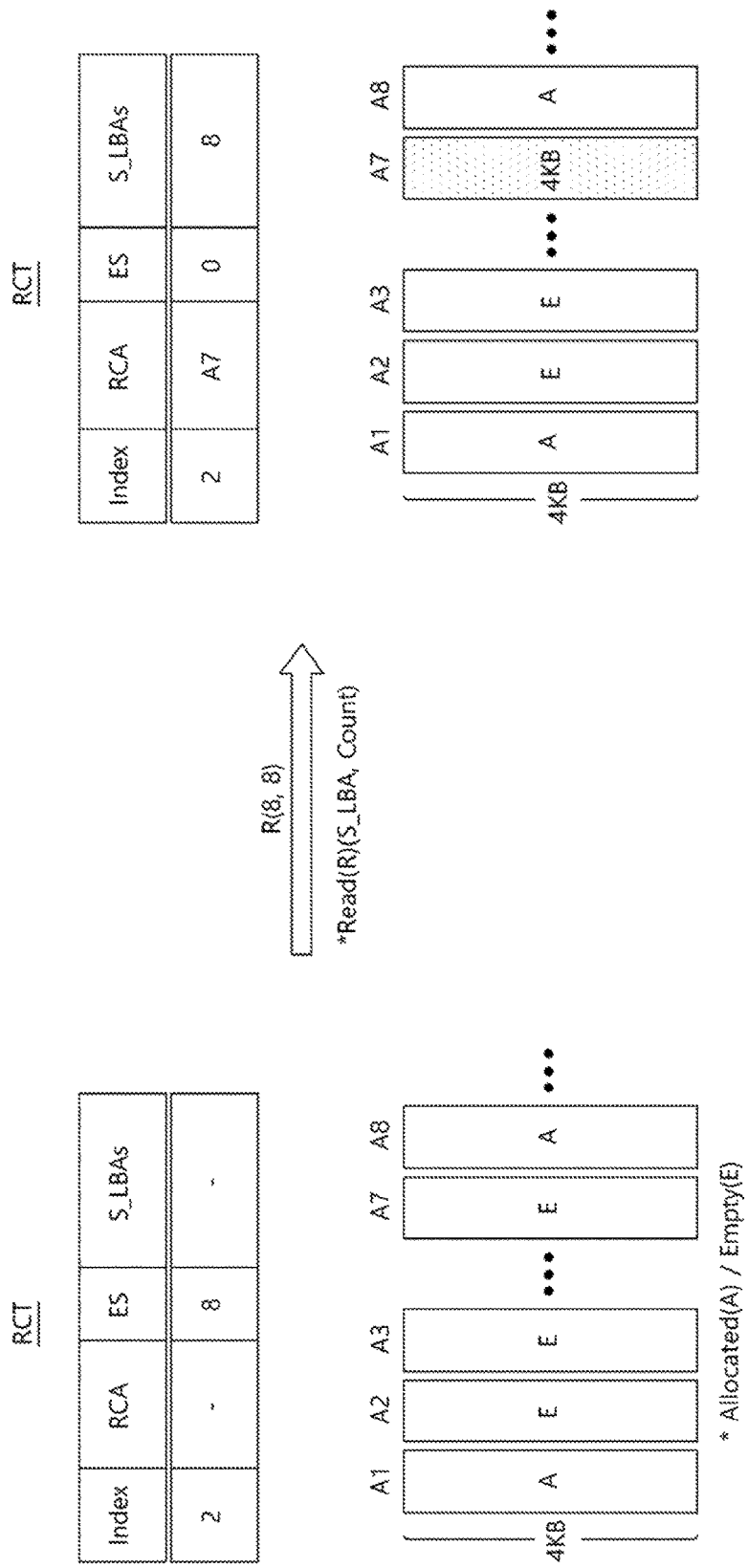

With reference to FIG. 8, an update process of the read cache table RCT and a data caching process in the case where the size of read-out data is smaller than or equal to the size of each read cache area RCA may be described.

Before a read request is received, the states of the read cache table RCT and the read cache RC may be as follows.

The index 2 may be in a state in which no data are matched thereto.

If a read request R(8, 8) for a set of 8 logical addresses from a start logical address 8 is received, since the size (4 KB=528 bytes*8) of read-out data is equal to the size (4 KB) of each read cache area RCA, the read cache table RCT may be updated and the read-out data may be cached as follows.

Since the start logical address 8 is a logical address belonging to the logical address group LG2 corresponding to the index 2 as shown in FIG. 6, matching may be made to index 2. Among the empty read cache areas A2, A3 and A7, the read cache area A7 may be matched to index 2. Since data are cached so that the matched read cache area A7 is fully cached, an empty size 0 of the read cache area A7 may be matched to the index 2.

Figure 9:
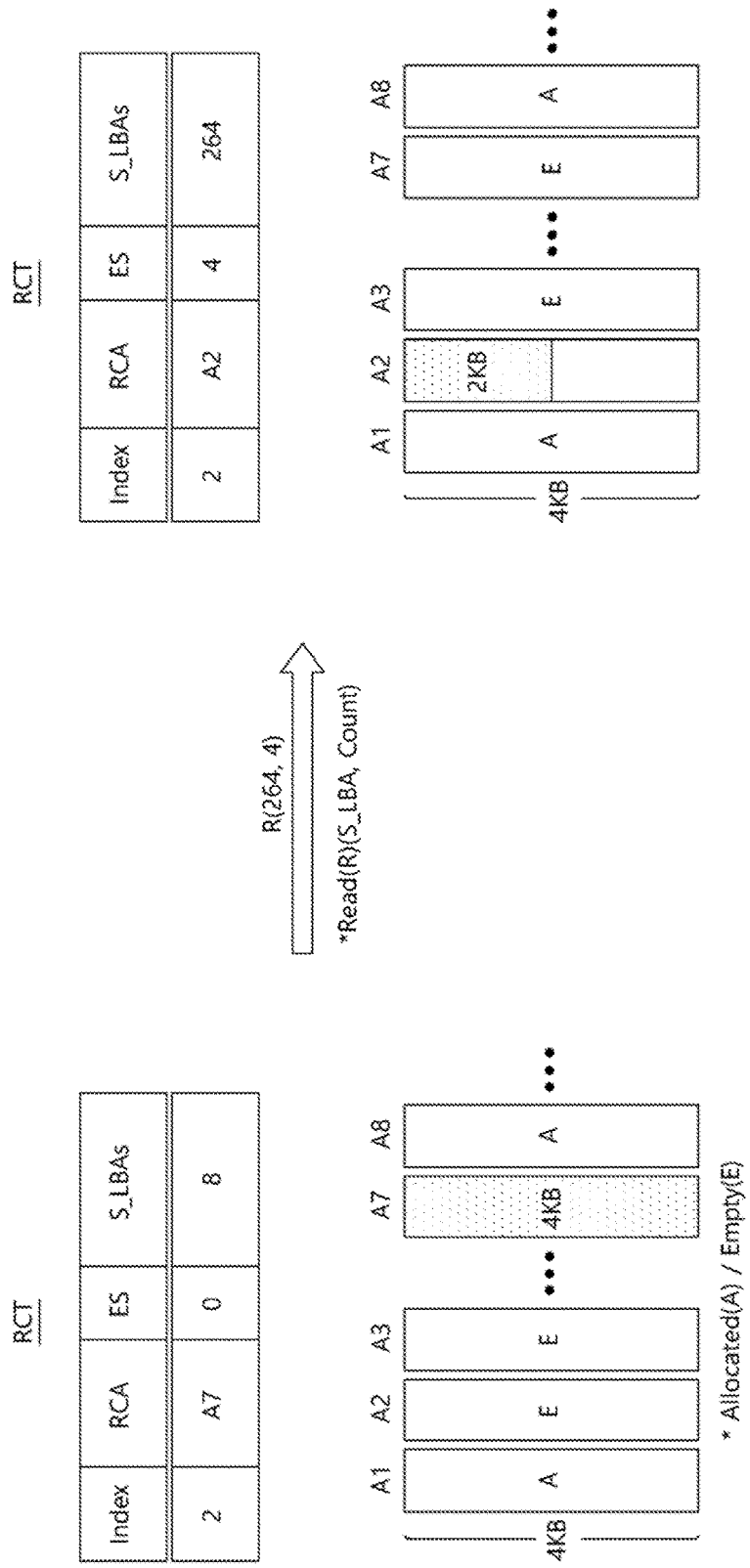

With reference to FIG. 9, an update process of the read cache table RCT and a data caching process in the case where a read cache area RCA has already been matched to an index corresponding to a logical address group to which a read-requested start logical address S_LBA belongs and in the case where the size of read-out data is greater than the empty size of the read cache area RCA is described.

Before a read request is received, the states of the read cache table RCT and the read cache RC may be as follows.

The index 2 may be in a state n which a read cache area A7, a start logical address 8 and an empty size 0 of the read cache area A7 are matched thereto.

If a read request R(264, 4) for a set of 4 logical addresses from a start logical address 264 is received, the read cache table RCT may be updated and the read-out data may be cached as follows.

Since the start logical address 264 is a logical address belonging to the logical address group LG2 corresponding to the index 2 as shown in FIG. 6, matching may be made to the index 2. Since the size 4 of the read-out data is greater than the empty size 0 of the read cache area A7 already matched to the index 2, the read-out data may not be cached in the read cache area A7. Accordingly, between empty read cache areas A2 and A3, the read cache area A2 may be newly matched to the index 2. Since the read-out data of 2 KB are cached in the matched read cache area A2, an empty size 4 of the read cache area A2 may be matched to the index 2.

Namely, in the case where the empty space of a matched read cache area is insufficient and thus read-out data may not be cached even though the read cache area has already been matched to an index corresponding to a logical address group to which a read-requested start logical address belongs, an empty read cache area may be newly matched.

Figure 10:
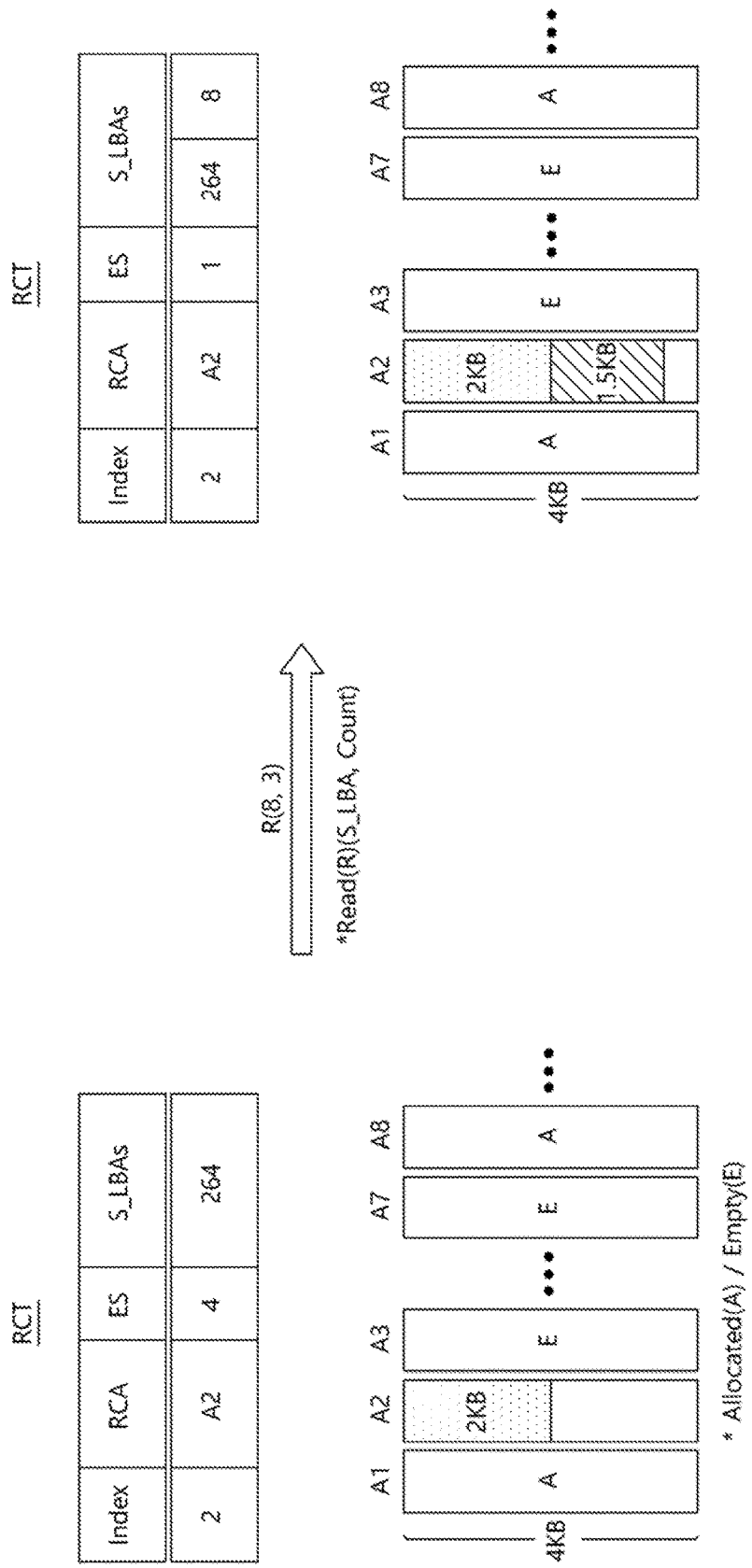

With reference to FIG. 10, an update process of the read cache table RCT and a data caching process in the case where a read cache area RCA has already been matched to an index corresponding to a logical address group to which a read-requested start logical address S_LBA belongs and in the case where the size of read-out data is smaller than or equal to the empty size of the read cache area RCA may be described.

Before a read request is received, the states of the read cache table RCT and the read cache RC may be as follows.

The index 2 may be in a state in which a read cache area A2, a start logical address 264 and an empty size 4 of the read cache area A2 are matched thereto.

If a read request R(8, 3) for a set of 3 logical addresses from a start logical address 8 is received, the read cache table RCT may be updated and the read-out data may be cached as follows.

Since the size 3 of the read-out data is smaller than the empty size 4 of the read cache area A2 already matched to the index 2 as shown in FIG. 6, it may not be necessary to match a new read cache area for caching the read-out data, and the read-out data may be cached in the read cache area A2. The start logical address 8 may be matched additionally to the already matched start logical address 264. Since read-out data of total 3.5 KB are cached in the matched read cache area A2, an empty size 1 of the read cache area A2 may be matched to the index 2.

Namely, in the case where a read cache area has already been matched to an index corresponding to a logical address group to which a read-requested start logical address belongs and the empty space of the matched read cache area is sufficient to cache read-out data, the already matched read cache area may be used as it is, to cache the read-out data.

Figure 11:
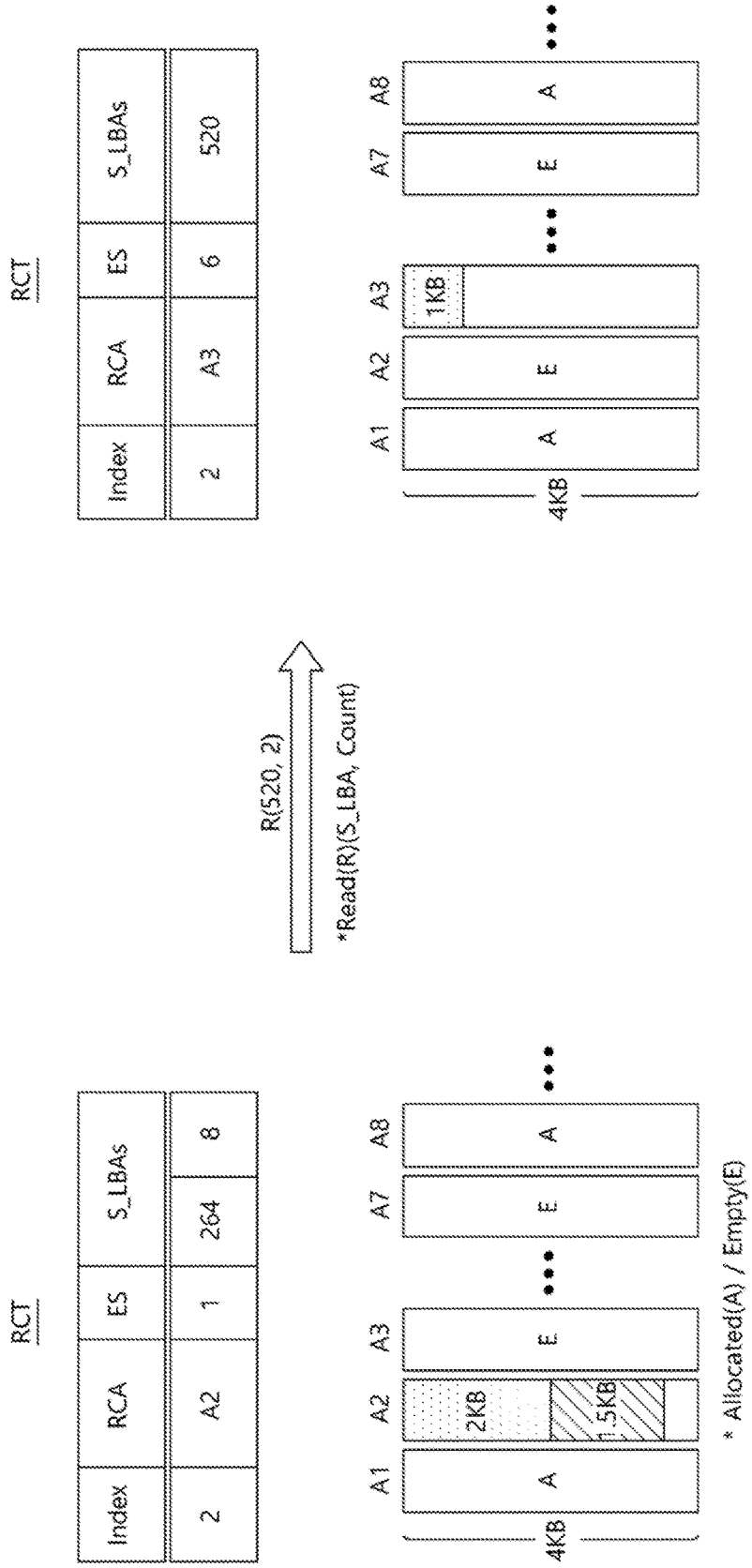

With reference to FIG. 11, an update process of the read cache table RCT and a data caching process in the case where a read cache area RCA has already been matched to an index corresponding to a logical address group to which a read-requested start logical address S_LBA belongs and in the case where the size of read-out data is greater than the empty size of the read cache area RCA may be described.

Before a read request is received, the states of the read cache table RCT and the read cache RC may be as follows.

The index 2 may be in a state in which a read cache area A2, start logical addresses 264 and 8 and an empty size 1 of the read cache area A2 are matched thereto.

If a read request R(520, 2) for a set of 2 logical addresses from a start logical address 520 is received, the read cache table RCT may be updated and the read-out data may be cached as follows.

Since the start logical address 520 is a logical address belonging to the logical address group LG2 corresponding to the index 2 as shown in FIG. 6, matching may be made to the index 2. Since the size 2 of the read-out data is greater than the empty size 1 of the read cache area A2 already matched to the index 2, the read-out data may not be cached in the read cache area A2. Accordingly, between empty read cache areas A3 and A7, the read cache area A3 may be newly matched to the index 2. Since the read-out data of 1 KB are cached in the matched read cache area A3, an empty size 6 of the read cache area A3 may be matched to the index 2.

In this case, the read cache area A2, the start logical addresses 264 and 8 and the empty size 1 of the read cache area A2 which have been matched to the index 2 may be removed. The read cache area A2 of which matching is removed may be converted into an empty (or not-matched)

read cache area. Matching new information data to the index 2 according to the read request R(520, 2) may mean that recently serviced data are cached and data cached by a previous read request are not cached any more.

Figure 12:
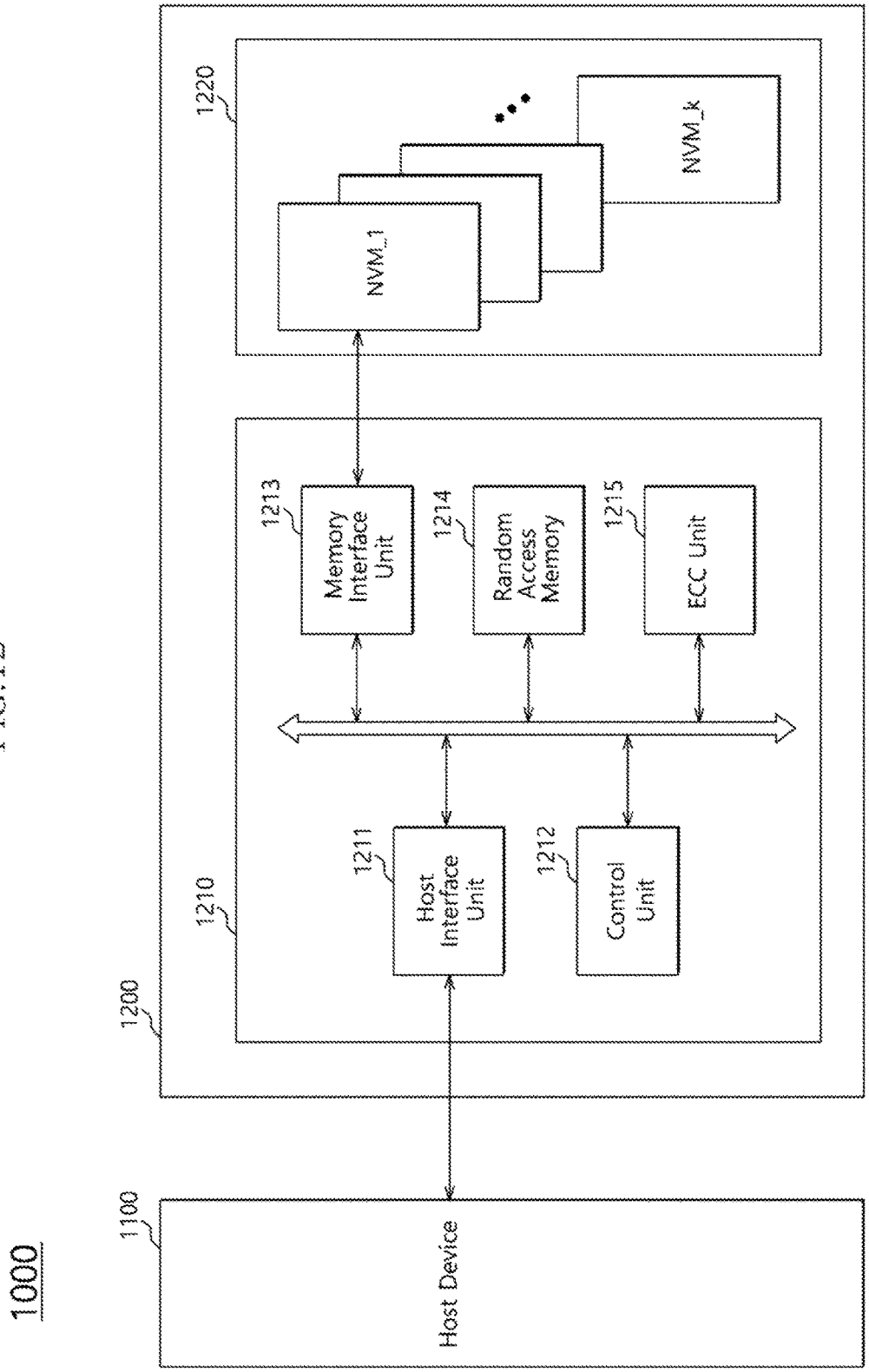
FIG. 12 is a block diagram illustrating a data processing system including a data storage device, according to an embodiment of the present invention.

FIG. 12 is a block diagram illustrating a data processing system including a data storage device according to an embodiment of the present invention.

Referring to FIG. 12, a data processing system 1000 may include a host device 1100 and a data storage device 1200.

The data storage device 1200 may include a controller 1210 and a nonvolatile memory device 1220. The data storage device 1200 may be used by being coupled to the host device 1100 such as a mobile phone, an MP3 player, a laptop computer, a desktop computer, a game player, a TV, an in-vehicle infotainment system, and the like. The data storage device 1200 is also referred to as a memory system.

The controller 1210 may include a host interface unit 1211, a control unit 1212, a memory interface unit 1213, a random access memory 1214, and an error correction code (ECC) unit 1215.

The control unit 1212 may control the general operations of the controller 1210 in response to a request from the host device 1100. The control unit 1212 may drive a firmware or a software for controlling the nonvolatile memory device 1220. The control unit 1212 may perform a read cache operation by referring to a read cache table, as described above with reference to FIG. 2 to FIG. 11.

The random access memory 1214 may be used as a working memory of the control unit 1212. The random access memory 1214 may be used as a buffer memory which temporarily stores the data read from the nonvolatile memory device 1220 or the data provided from the host device 1100. The random access memory 1214 may be used as a read cache which caches data transmitted most recently or transmitted frequently, among data transmitted to the host device 1100.

The host interface unit 1211 may interface the host device 1100 and the controller 1210. For example, the host interface unit 1211 may communicate with the host device 1100 through one of various interface protocols such as a universal serial bus (USB) protocol, a universal flash storage (UFS) protocol, a multimedia card (MMC) protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, and a serial attached SCSI (SAS) protocol.

The memory interface unit 1213 may interface the controller 1210 and the nonvolatile memory device 1220. The memory interface unit 1213 may provide commands and addresses to the nonvolatile memory device 1220. Furthermore, the memory interface unit 1213 may exchange data with the nonvolatile memory device 1220.

The ECC unit 1215 may encode data to be stored in the nonvolatile memory device 1220 by using the error correction code. Also, the ECC unit 1215 may decode data read out from the nonvolatile memory device 1220 by using the error correction code. The ECC unit 1215 may be included in the memory interface unit 1213.

The nonvolatile memory device 1220 may be used as the storage medium of the data storage device 1200. The nonvolatile memory device 1220 may include a plurality of nonvolatile memory chips (or dies) NVM_1 to NVM_k.

The controller 1210 and the nonvolatile memory device 1220 may be manufactured as any one of various data storage devices. For example, the controller 1210 and the nonvolatile memory device 1220 may be integrated into one semiconductor device and may be manufactured as any one of a multimedia card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a Personal Computer Memory Card International Association (PCMCIA) card, a compact flash (CF) card, a smart media card, a memory stick, and the like.

Figure 13:
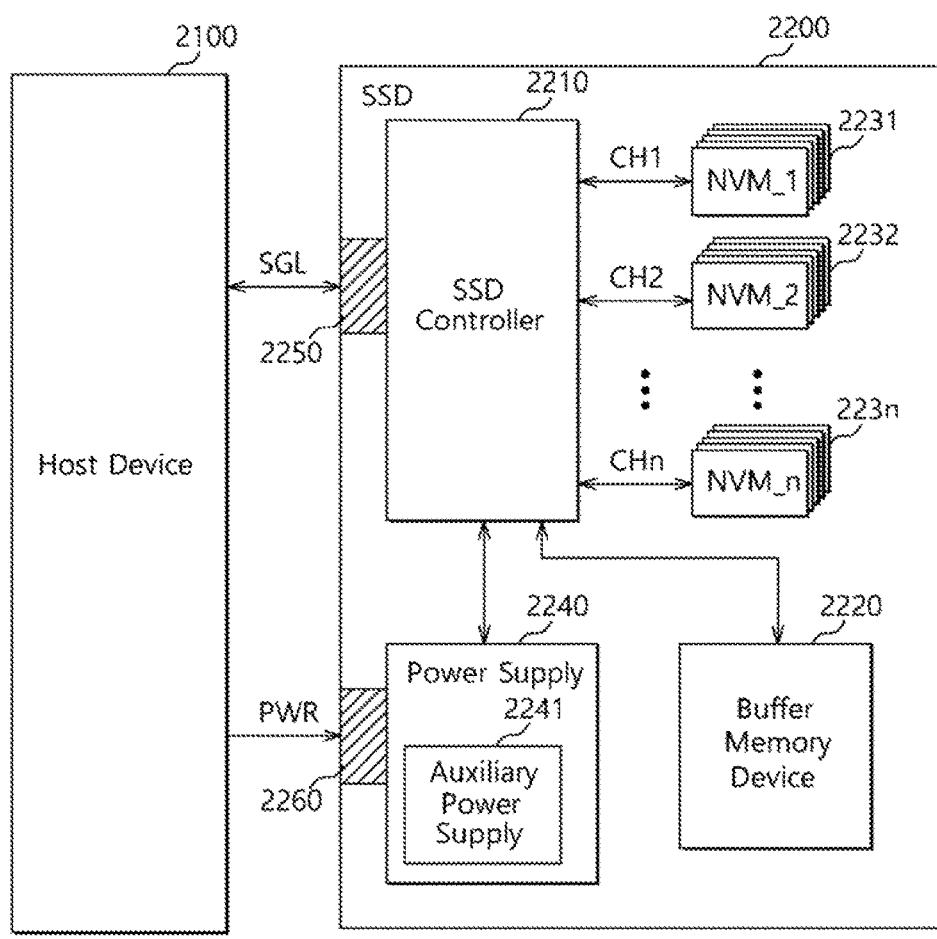
FIG. 13 is a block diagram illustrating a data processing system including a solid state drive (SSD), according to an embodiment of the present invention.

FIG. 13 is a block diagram illustrating a data processing system including a solid state drive (SSD) according to an embodiment of the present invention.

Referring to FIG. 13, a data processing system 2000 may include a host device 2100 and a solid state drive (SSD) 2200.

The SSD 2200 may include an SSD controller 2210, a buffer memory device 2220, nonvolatile memory devices 2231 to 223n, a power supply 2240, a signal connector 2250, and a power connector 2260.

The SSD controller 2210 may access the nonvolatile memory devices 2231 to 223n in response to a request from the host device 2100.

The buffer memory device 2220 may temporarily store data which are to be stored in the nonvolatile memory devices 2231 to 223n. Further, the buffer memory device 2220 may temporarily store data which are read from the nonvolatile memory devices 2231 to 223n. The data temporarily stored in the buffer memory device 2220 may be transmitted to the host device 2100 or the nonvolatile memory devices 2231 to 223n under the control of the SSD controller 2210.

The nonvolatile memory devices 2231 to 223n may be used as storage media of the SSD 2200. The nonvolatile memory devices 2231 to 223n may be coupled with the SSD controller 2210 through a plurality of channels CH1 to CHn, respectively. One or more nonvolatile memory devices may be coupled to one channel. The nonvolatile memory devices coupled to one channel may be coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power so as to allow the SSD 2200 to be normally terminated when a sudden power-off occurs. The auxiliary power supply 2241 may include large capacitance capacitors capable of being charged with power PWR.

The SSD controller 2210 may exchange a signal SGL with the host device 2100 through the signal connector 2250. The signal SGL may include a command, an address, data, and the like. The signal connector 2250 may be configured by a connector such as of parallel advanced technology attachment (PATA), serial advanced technology attachment (SATA), small computer system interface (SCSI), serial attached SCSI (SAS), peripheral component interconnection (PCI) and PCI express (PCI-E) protocols, according to the interface scheme between the host device 2100 and the SSD 2200.

Figure 14:
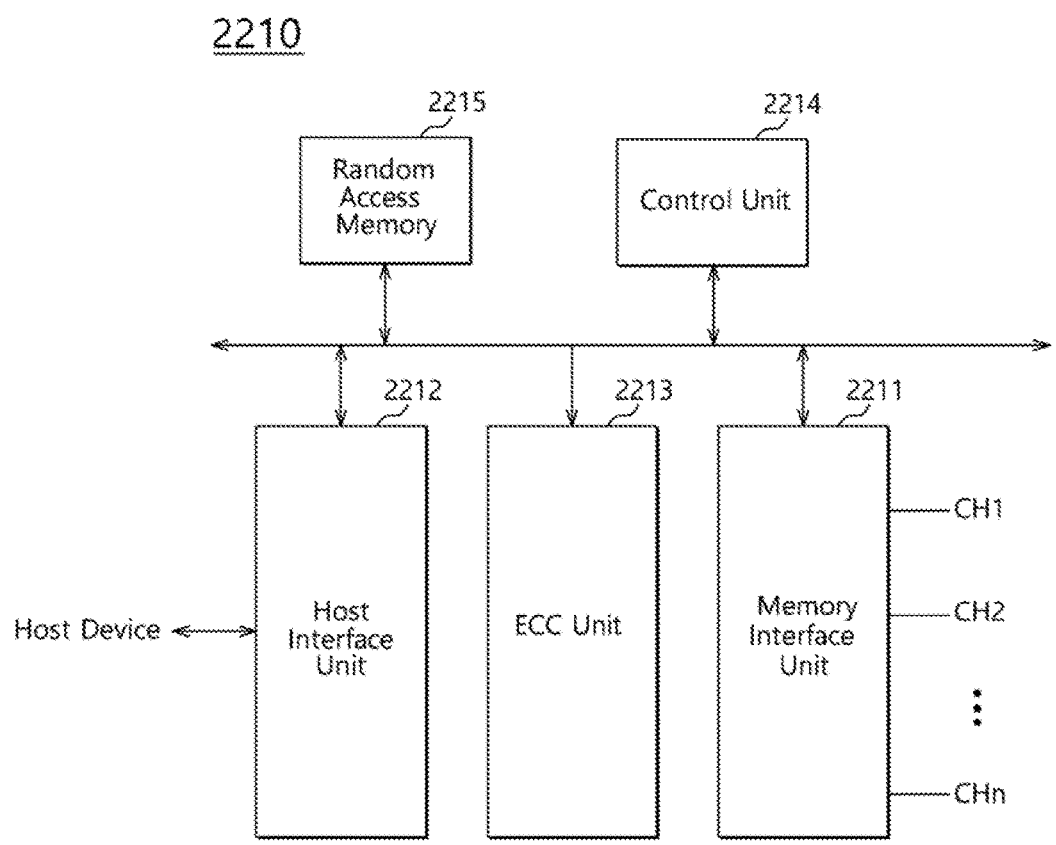
FIG. 14 is a block diagram illustrating a solid state drive (SSD) controller, according to an embodiment of the present invention.

FIG. 14 is a block diagram illustrating a solid state drive (SSD) controller, according to an embodiment of the present invention. For example, the SSD controller of FIG. 14 may be the SSD controller 2210 shown in FIG. 13.

Referring to FIG. 14, the SSD controller 2210 may include a memory interface unit 2211, a host interface unit 2212, an error correction code (ECC) unit 2213, a control unit 2214, and a random access memory 2215.

The memory interface unit 2211 may provide a control signal such as a command and an address to the nonvolatile memory devices 2231 to 223n of FIG. 13. Moreover, the memory interface unit 2211 may exchange data with the nonvolatile memory devices 2231 to 223n. The memory interface unit 2211 may scatter the data transmitted from the buffer memory device 2220 to the respective channels CH1 to CHn, under the control of the control unit 2214. Furthermore, the memory interface unit 2211 may transmit the data read from the nonvolatile memory devices 2231 to 223n to the buffer memory device 2220, under the control of the control unit 2214.

The host interface unit 2212 may provide an interface with the SSD 2200 in correspondence to the protocol of the host device 2100 of FIG. 13. For example, the host interface unit 2212 may communicate with the host device 2100 through one of parallel advanced technology attachment (PATA), serial advanced technology attachment (SATA), small computer system interface (SCSI), serial attached SCSI (SAS), peripheral component interconnection (PCI) and PCI express (PCI-E) protocols. In addition, the host interface unit 2212 may perform a disk emulating function of supporting the host device 2100 to recognize the SSD 2200 as a hard disk drive (HDD).

The control unit 2214 may analyze and process the signal SGL inputted from the host device 2100 of FIG. 13. The control unit 2214 may control the operations of the buffer memory device 2220 and the nonvolatile memory devices 2231 to 223n of FIG. 13 according to a firmware or a software for driving the SSD 2200. The control unit 2214 may perform a read cache operation by referring to a read cache table, as described above with reference to FIG. 2 to FIG. 11.

The random access memory 2215 may be used as a working memory of the control unit 2214. The random access memory 2215 may be used as a read cache which caches data transmitted most recently or transmitted frequently, among data transmitted to the host device 2100.

The ECC unit 2213 may generate parity data to be transmitted to the nonvolatile memory devices 2231 to 223n, among data stored in the buffer memory device 2220. The generated parity bits may be stored along with data in the nonvolatile memory devices 2231 to 223n. The ECC unit 2213 may detect an error of the data read out from the nonvolatile memory devices 2231 to 223n. When the detected error is within a correctable range, the ECC unit 2213 may correct the detected error.

Figure 15:
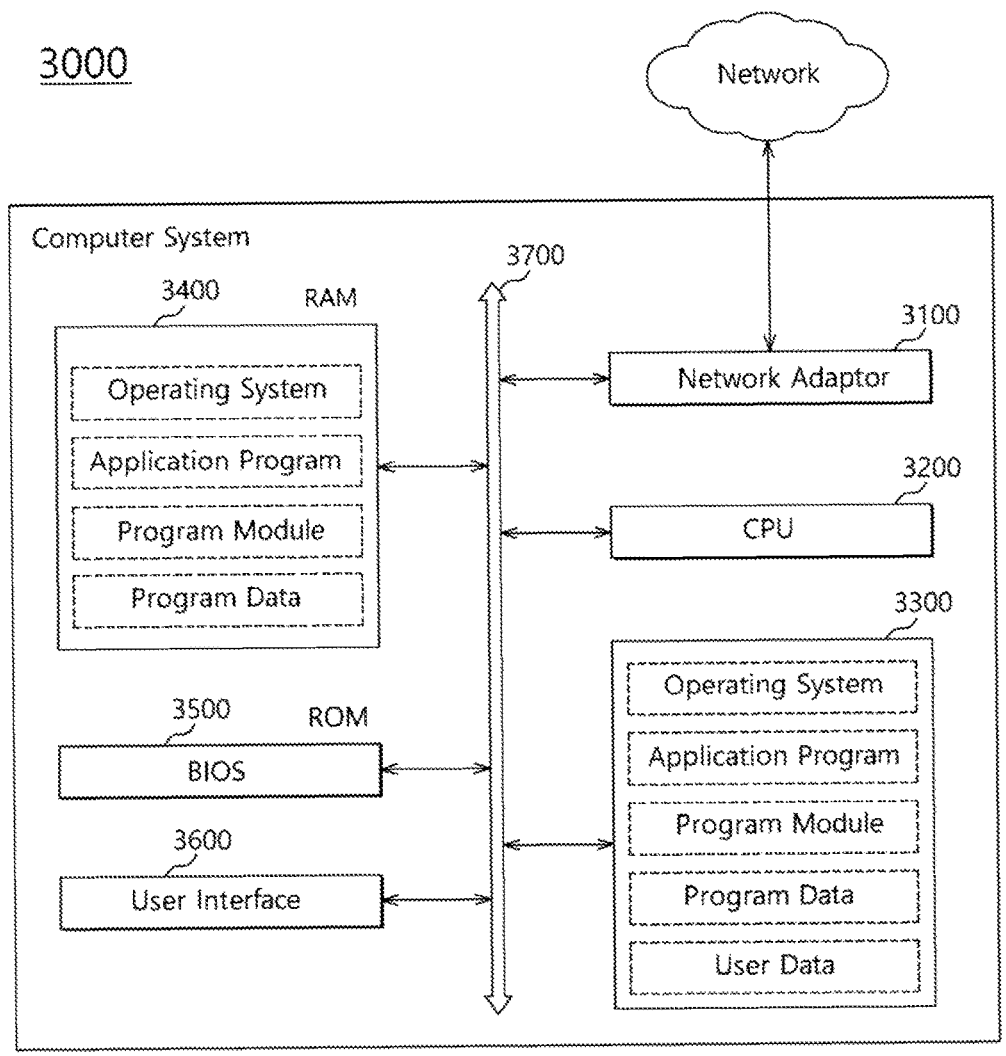
FIG. 15 is a block diagram illustrating a computer system comprising a data storage device, according to an embodiment of the present invention.

FIG. 15 is a block diagram illustrating a computer system to which a data storage device, according to an embodiment of the present invention is mounted.

Referring to FIG. 15, a computer system 3000 includes a network adaptor 3100, a central processing unit 3200, a data storage device 3300, a random access memory (RAM) 3400, a read only memory (ROM) 3500 and a user interface 3600, which are electrically coupled to a system bus 3700. The data storage device 3300 may be constructed by the data storage device 100 shown in FIG. 1, the data storage device 1200 shorn in FIG. 12 or the SSD 2200 shown in FIG. 13.

The network adaptor 3100 may provide interfacing between the computer system 3000 and external networks. The central processing unit 3200 performs general operations for driving an operating system residing at the RAM 3400 or an application program.

The data storage device 3300 may store general data necessary in the computer system 3000. For example, an operating system for driving the computer system 3000, an application program, various program modules, program data and user data may be stored in the data storage device 3300.

The RAM 3400 may be used as the working memory of the computer system 3000. Upon booting, the operating system, the application program, the various program modules and the program data necessary for driving programs, which are read from the data storage device 3300, may be loaded on the RAM 3400. A BIOS (basic input/output system) which is activated before the operating system is driven may be stored in the ROM 3500. Information exchange between the computer system 3000 and a user may be implemented through the user interface 3600.

Figure 16:
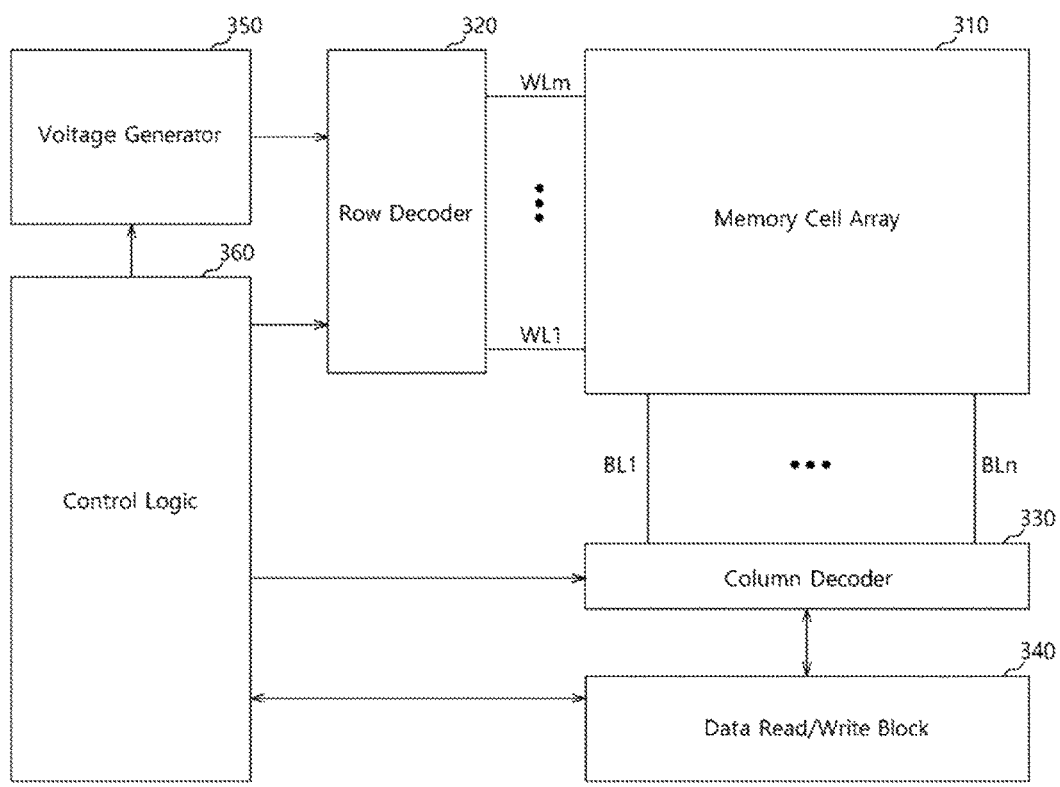
FIG. 16 is a block diagram illustrating a nonvolatile memory device included in a data storage device, according to an embodiment of the present invention.

FIG. 16 is a block diagram illustrating a nonvolatile memory device included in a data storage device, according to an embodiment of the present invention. For example, the data storage device of FIG. 16 may be the data storage device 300 shown in FIG. 1.

Referring to FIG. 16, the nonvolatile memory device 300 may include a memory cell array 310, a row decoder 320, a column decoder 330, a data read/write block 340, a voltage generator 350, and a control logic 360.

The memory cell array 310 may include memory cells which are arranged at areas where word lines WL1 to WLm and bit lines BL1 to BLn cross each other. The memory cells may be grouped by an access unit, such as a memory block as an erase unit and a page as a program and read unit.

The row decoder 320 may be coupled with the memory cell array 310 through the word lines WL1 to WLm. The row decoder 320 may operate according to the control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The column decoder 330 may be coupled with the memory cell array 310 through the bit lines BL1 to BLn. The column decoder 330 may operate according to the control of the control logic 360. The column decoder 330 may decode an address provided from the external device. The column decoder 330 may couple the bit lines BL1 to BLn with read/write circuits of the data read/write block 340 which respectively correspond to the bit lines BL1 to BLn, based on a decoding result. Also, the column decoder 330 may drive the bit lines BL1 to BLn, based on the decoding result.

The data read/write block 340 may operate according to the control of the control logic 360. The data read/write block 340 may operate as a write driver or a sense amplifier according to an operation mode. For example, the data read/write block 340 may operate as a write driver which stores data provided from the external device, in the memory cell array 310 in a write operation. For another example, the data read/write block 340 may operate as a sense amplifier which reads out data from the memory cell array 310 in a read operation.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been described above, it may be understood to those skilled in the art that the embodiments described are examples only. Accordingly, the data storage device and the operating method thereof described herein should not be limited based on the described embodiments.

It will be apparent to those skilled in the art that various changes and modifications may be made without departing from the spirit and scope of the invention as defined in the following claims.

What is claimed is:

1. A method for operating a data storage device including a nonvolatile memory device, comprising:
dividing a cache into a plurality of cache areas, wherein the cache caches data read out from the nonvolatile memory device;
grouping a plurality of logical addresses into a plurality of logical address groups;
allocating indexes to the respective logical address groups;
assigning a read-requested first logical address set, a first cache area where data corresponding to the first logical address set are cached and an empty size of the first cache area, to an index corresponding to a logical address group to which the first logical address set belongs; and
caching data corresponding to the second logical address set by referring to the empty size of the first cache area when a read request for a second logical address set belonging to the logical address group corresponding to the index is received,
wherein the grouping of the plurality of logical addresses into the plurality of logical address groups comprises:
grouping the plurality of logical addresses from start logical addresses being incremented by a predetermined unit to a size of each cache area, into the plurality of logical address groups.

2. The method according to claim 1, wherein the caching of the data corresponding to the second logical address set comprises,
when a size of the data corresponding to the second logical address set is greater than the empty size of the first cache area, caching the data corresponding to the second logical address set in an empty second cache area, and
matching the second cache area and an empty size of the second cache area the index.

3. The method according to claim 2, further comprising:
removing a start logical address of the first logical address set, the first cache area and the empty size of the first cache area, from the index.

4. The method according to claim 1, wherein the caching of the data corresponding to the second logical address set comprises,
when the size of the data corresponding to the second logical address set is smaller than or equal to the empty size of the first cache area, caching the data corresponding to the second logical address set in the first cache area.

5. The method according to claim 4, further comprising:
matching additionally a start logical address of the second logical address set to the index.

6. The method according to claim 1, further comprising:
removing the start logical address of the first logical address set from the index when a write request for the first logical address set is received.

7. A data storage device comprising:
a nonvolatile memory device;
a control unit configured to read out data from the nonvolatile memory device according to a read request received from a host device; and
a cache configured to cache data read out from the nonvolatile memory device,
wherein the control unit divides the cache into a plurality of cache areas, groups a plurality of logical addresses of a predetermined unit into a plurality of logical address groups, allocates indexes to the respective logical address groups, and assigns, when data corresponding to a read-requested first logical address set are cached in any one of the cache areas, a start logical address of the first logical address set, a first cache area where the data corresponding to the first logical address set are cached and an empty size of the first cache area, to an index corresponding to a logical address group to which the first logical address set belongs,
wherein the control unit groups logical addresses from start logical addresses being incremented by the predetermined unit to the size of each cache area, into each logical address group, and
the control unit caches, when a read request for a second logical address set belonging to the logical address group corresponding to the index is received, data corresponding to the second logical address set by referring to the empty size of the first cache area.

8. The data storage device according to claim 7, further comprising:
command queues configured to queue requests received from the host device,
wherein the control unit allocates indexes corresponding to the number of command queues, to the logical address groups.

9. The data storage device according to claim 8, wherein the control unit determines the predetermined unit by a value obtained by a combination of the number of the command queues and a size of each cache area.

10. The data storage device according to claim 9, wherein the size of each cache area corresponds to an amount of data read out from the nonvolatile memory device by one read operation.

11. The data storage device according to claim 10, wherein the size of the cache area is determined by the number of sectors.

12. The data storage device according to claim 7, wherein, when it is determined that a size of data corresponding to a read-requested logical address set is greater than a reference for determining sequential data, the control unit does not cache the data corresponding to the read-requested logical address set.

13. The data storage device according to claim 7, wherein, when it is determined that a size of the data corresponding to the second logical address set is greater than the empty size of the first cache area, the control unit caches the data corresponding to the second logical address set in an empty second cache area, and the second cache area and an empty size of the second cache area are matched to the index.

14. The data storage device according to claim 13, wherein the control unit removes the start logical address of the first logical address set, the first cache area and the empty size of the first cache area, from the index.

15. The data storage device according to claim 7, wherein, when it is determined that the size of the data corresponding to the second logical address set is smaller than or equal to the empty size of the first cache area, the control unit caches the data corresponding to the second logical address set in the first cache area.

16. The data storage device according to claim 15, wherein the control unit additionally matches a start logical address of the second logical address set to the index.

* * * * *